United States Patent
Ma et al.

(10) Patent No.: US 6,977,982 B2
(45) Date of Patent: Dec. 20, 2005

(54) DIFFERENTIAL PHASE DETECTION DEVICE AND TRACKING ERROR SIGNAL DETECTION APPARATUS USING THE SAME

(75) Inventors: Byung-in Ma, Gyeonggi-do (KR);
In-sik Park, Gyeonggi-do (KR);
Joong-eon Seo, Gyeonggi-do (KR);
Sung-ro Go, Gyeonggi-do (KR);
Soo-yul Jung, Gyeonggi-do (KR);
Chang-jin Yang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 772 days.

(21) Appl. No.: 09/986,978

(22) Filed: Nov. 13, 2001

(65) Prior Publication Data

US 2002/0094024 A1    Jul. 18, 2002

(30) Foreign Application Priority Data

Dec. 26, 2000   (KR) ............................... 2000-82052

(51) Int. Cl.$^7$ .............................. H04L 7/00; G11B 7/00
(52) U.S. Cl. ................ 375/375; 369/44.27; 369/44.32; 369/44.34
(58) Field of Search .......................... 375/375; 369/44

(56) References Cited

U.S. PATENT DOCUMENTS

| 5,258,968 A | 11/1993 | Matsuda et al. ......... 369/44.35 |
| 5,914,922 A * | 6/1999 | Supino et al. ........... 369/44.28 |
| 5,956,304 A | 9/1999 | Supino et al. ........... 369/44.34 |
| 6,507,544 B1 * | 1/2003 | Ma et al. ................. 369/44.41 |

FOREIGN PATENT DOCUMENTS

| EP | 0 895 227 A1 | 3/1999 |
| JP | 63-152031 | 6/1988 |
| JP | 9-161285 | 6/1997 |
| JP | 10-97724 | 4/1998 |
| JP | 10-97725 | 4/1998 |
| JP | 10-177727 | 6/1998 |
| JP | 2000-251283 | 9/2000 |

* cited by examiner

*Primary Examiner*—Stephen Chin
*Assistant Examiner*—Jaison Joseph
(74) *Attorney, Agent, or Firm*—Stein, McEwen & Bui, LLP

(57) ABSTRACT

A differential phase detection device receives first through fourth detection signals from a photodetector and detects a differential phase signal therefrom, the differential phase detection device includes a slicer slicing and digitizing each of the detection signals with respect to a reference level. A synthesizer synthesizes the digitized detection signals and generates therefrom synthesis signals. A phase difference detector compares phases of the synthesis signals and outputs a first phase difference signal and a second phase difference signal. A matrix circuit processes the first and second phase difference signals to output the differential phase signal.

40 Claims, 13 Drawing Sheets

DIFFERENTIAL PHASE DETECTION DEVICE AND TRACKING ERROR SIGNAL DETECTION APPARATUS USING THE SAME

CROSS-REFERENCE TO RELATED APPLICATIONS

This application claims the benefit of Korean Application No. 2000-82052, filed Dec. 26, 2000, in the Korean Industrial Property Office, the disclosure of which is incorporated herein by reference.

BACKGROUND OF THE INVENTION

1. Field of the Invention

The present invention relates to a differential phase detection device having an improved structure and a tracking error signal detection apparatus using the same.

2. Description of the Related Art

Generally, as shown in FIGS. 1 and 2, a tracking error signal detection apparatus using a differential phase detection (DPD) device includes a four-division photodetector 10 for receiving light reflected from a recording medium, and differential phase detection devices 20 and 30 for receiving four detection signals a, b, c, and d output from the four-division photodetector 10, generating a plurality of phase difference signals $P_1$, $P_2$, $P_3$, $P_4$, $P_5$, and $P_6$, and performing an operation on the plurality of phase difference signals to detect a tracking error signal TES' and TES".

The four-division photodetector 10 is divided into two parts, one part in a direction (R' direction) corresponding to a radial direction of the recording medium and another part in a direction (T' direction) corresponding to a tangential direction of the recording medium. First through fourth division plates A, B, C, and D of the four-division photodetector 10 are arranged counterclockwise and generate the first through fourth detection signals a, b, c and d, respectively.

Referring to FIG. 1, the differential phase detection device 20, as an example of conventional one, includes four capacitors 21, four equalizers 22, four slicers 23, four phase shifters 24, two phase difference detectors 25 and 27 and a matrix circuit 29. The capacitors 21 perform AC coupling on the respective first through fourth detection signals a, b, c, and d, thereby removing DC components. Each equalizer 22 amplifies the high-frequency component of a signal input via the corresponding capacitor 21. Each slicer 23 digitizes the signal amplified by the corresponding equalizer 22. Each phase shifter 24 shifts the phase of the digitized signal to control an offset or a balance of a final output. The phase difference detector 25 detects a phase difference between the digitized signals corresponding to the first and second detection signals a and b, which are input from corresponding two phase shifters 24, and outputs first and second phase difference signals p1 and p2. The other phase difference detector 27 detects a phase difference between the digitized signals corresponding to the third and fourth detection signals c and d, which are input from corresponding two phase shifters 24, and outputs third and fourth phase difference signals p3 and p4. The matrix circuit receives the first through fourth phase difference signals p1, p2, p3, and p4 and performs an operation on the signals, thereby outputting the tracking error signal TES'. The tracking error signal TES' is a differential signal between a sum p1+p3 of the first and third phase difference signals p1 and p3 and a sum p2+p4 of the second and fourth phase difference signals p2 and p4. Because the conventional differential phase detection device 20 includes the two phase difference detectors 25 and 27 to detect the phase difference signals, the entire volume of the differential phase detection device 20 is large, and an output signal can be degraded due to the difference between the two phase difference detectors 25 and 27 in a gain characteristic.

Referring to FIG. 2, the differential phase detection device 30, as another example of a conventional device, has a structure that overcomes the problems of the differential phase detection device 20 of FIG. 1. The differential phase detection device 30 includes four capacitors 31, four delay units 32, two equalizers 33a and 33b, two slicers 34a and 34b, two phase shifters 35a and 35b, a phase difference detector 37 and a matrix circuit 39. In FIGS. 1 and 2, the same reference numerals denote same elements having the same functions.

The capacitors 31 perform AC coupling on respective first through fourth detection signals a, b, c and d received from the four-division photodetector 10, thereby removing DC components. The delay units 32 time-delay the first through fourth detection signals a, b, c, and d received from the respective capacitors 31. The delay units 32 are provided for compensating for an offset of a final output, that is, a tracking error signal TES", when a shift of an objective lens of an optical pickup occurs, or when a depth of a pit recorded on an optical disc deviates from a specified value. The delay units 32 relatively delay the first and second detection signals a and b output from the preceding first and second division plates A and B, respectively, in a T' direction or the third and fourth detection signals c and d output from the succeeding third and fourth division plates C and D, respectively. The delay units 32 appropriately delay the first detection signal a and/or the third detection signal c such that a delay value applied to the first detection signal a becomes positive or negative with respect to the third detection signal c. Likely, the delay units 32 appropriately delay the second detection signal b and/or the fourth detection signal d such that a delay value applied to the second detection signal b becomes positive or negative with respect to the fourth detection signal d.

The first and third detection signals a and c output from the delay units 32 are summed and equalized by the equalizer 33a. The second and fourth detection signals b and d output from the delay units 32 are summed and equalized by the equalizer 33b. The slicers 34a and 34b digitize the amplified sum signals from the equalizers 33a and 33b, respectively. The phase shifters 35a and 35b shift phases of the respective digitized sum signals to control an offset or a balance of a final output. The phase difference detector 37 detects a phase difference between sum signals received from the respective phase shifters 35a and 35b and outputs two phase difference signals p5 and p6. The matrix circuit 39 performs a differential operation on the two phase difference signals p5 and p6 received from the phase difference detector 37 to output the tracking error signal TES".

Because the differential phase detection device 30 of FIG. 2 includes one phase difference detector 37, a problem of a gain error between the two phase difference detectors 25 and 27 occurring in the device of FIG. 1 does not occur. However, in order to realize a structure using the one phase difference detector 37, the differential phase detection device 30 of FIG. 2 employs the four delay units 32 to compensate for the phase difference between the first and third detection signals a and c and the phase difference between the second and fourth detection signals b and d. Accordingly, the total volume of the differential phase detection device 30 is large due to a large volume of the block of the delays 32, and a large amount of power is required to operate the delays 32. In addition, because the delay values of the delay units 32 are related to the frequency of a reproduced signal, a unit for selecting a delay value appropriate for a multiple speed at which data will be reproduced from an optical disc is required. Consequently, the differential phase detection device 30 of FIG. 2 has a larger volume than the differential phase detection device 20 of FIG. 1 and consumes a larger amount of power.

SUMMARY OF THE INVENTION

Various objects and advantages of the invention will be set forth in part in the description that follows and, in part, will be obvious from the description, or may be learned by practice of the invention.

To solve the above problems, the present invention to provides a differential phase detection device having an improved structure for employing a single phase difference detector without using a delay unit and a tracking error signal detection apparatus using the same.

Accordingly, to achieve the above and other objects of the invention, there is provided a differential phase detection device detecting a differential phase signal from first through fourth signals. The differential phase detection device includes a slicer slicing and digitizing each of the first through fourth signals with respect to a reference level; a first synthesizer synthesizing the first digitized signal and the third digitized signal to generate a first synthesis signal; a second synthesizer synthesizing the second digitized signal and the fourth digitized signal to generate a second synthesis signal; a phase difference detector comparing a phase of the first synthesis signal with a phase of the second synthesis signal to generate a first phase difference signal and a second phase difference signal; and a matrix circuit determining a difference between the first and second phase difference signals received from the phase difference detector to output the differential phase signal.

Here, the first and second synthesizers perform a synthesis method including one of time averaging, an AND operation, or an OR operation on the first and third detection signals and the second and fourth detection signals to generate the first and second synthesis signals, respectively.

The differential phase detection device further includes an alternating current (AC) coupler removing direct current (DC) components from the first through fourth signals. An equalizer amplifies the first through fourth signals or the first through fourth signals from the AC coupler, wherein the equalizer is provided between the AC coupler and the slicer.

The differential phase detection device further includes a phase shifter shifting a phase of an input signal between the slicer and the first and second synthesizers or between the first and second synthesizers and the phase difference detector.

There is also provided a tracking error signal detection apparatus including a photodetector including first through fourth division plates which are disposed counterclockwise or clockwise along directions corresponding to radial and tangential directions of the recording medium, wherein the first and third division plates are positioned in one diagonal direction and the second and fourth division plates are position in another diagonal direction and the first through fourth division plates receive light reflected from a recording medium to generate first through fourth detection signals, respectively; and a differential phase detection device detecting a tracking error signal from the first through fourth detection signals output from the photodetector, the differential phase detection device including: a slicer slicing and digitizing each of the first through fourth detection signals with respect to a reference level, a first synthesizer synthesizing the first digitized signal and the third digitized signal to generate a first synthesis signal, a second synthesizer synthesizing the second signal and the fourth signal to generate a second synthesis signal, a phase difference detector comparing a phase of the first synthesis signal with a phase of the second synthesis signal to generate a first phase difference signal and a second phase difference signal, and a matrix circuit processing the first or the second phase difference signals received from the phase difference detector to output a tracking error signal.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE PREFERRED EMBODIMENTS

Figure 3:
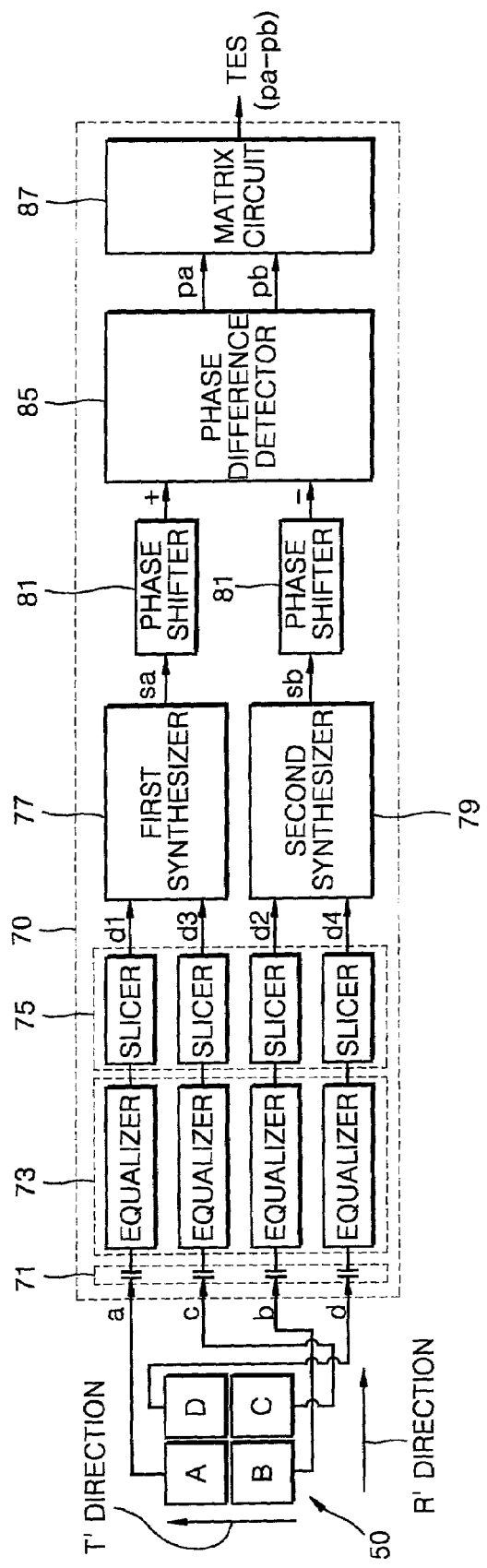
FIG. 3 is a schematic block diagram illustrating a tracking error signal detection apparatus using a differential phase detection device according to an embodiment of the present invention.

FIG. 3 is a schematic block diagram illustrating an embodiment of a tracking error signal detection apparatus using a differential phase detection device according to the present invention. Referring to FIG. 3, the tracking error signal detection apparatus includes a photodetector 50 for receiving light reflected from a recording medium and a differential phase detection device 70 for detecting a differential phase from detection signals a, b, c and d output from the photodetector 50.

The photodetector 50 includes first through fourth division plates A, B, C and D in R' and T' directions counter-clockwise (or clockwise). The first and third division plates A and C are positioned in one diagonal line, and the second and fourth division plates B and D are positioned in another diagonal line. The first through fourth detection signals a, b, c and d output from the first through fourth division plates A, B, C and D, respectively, are input to the differential phase detection device 70.

The differential phase detection device 70 includes a slicer unit 75 having four slicers, first and second synthesizers 77 and 79, a phase difference detector 85 and a matrix circuit 87. The differential phase detection device 70 may also include an AC coupling unit 71 and/or an equalizer unit 73 prior to the slicer unit 75.

The AC coupling unit 71 includes capacitors to perform AC coupling on the first through fourth detection signals a, b, c and d to remove DC components. After passing through the AC coupling unit 71, the first through fourth detection signals a, b, c and d only have high frequency components. The equalizer unit 73 amplifies the high frequency components of the first through fourth detection signals a, b, c and d from the AC coupling unit 71. The slicer unit 75 slices and digitizes each of the first through fourth detection signals a, b, c and d from the equalizer unit 73 with respect to a predetermined reference level, thereby generating first through fourth digitized signals d1, d2, d3, and d4.

Each of the first and second synthesizers 77 and 79 is a logical matrix and includes a unit for time-averaging an input signal, an AND gate, or an OR gate. The first synthesizer 77 performs time averaging, an AND operation or an OR operation on the first and third digitized signals d1 and d3 from the slicer unit 75, thereby generating a first synthesis signal sa. Like the first synthesizer 77, the second synthesizer 79 performs time averaging, an AND operation or an OR operation on the second and fourth digitized signals d2 and d4 from the slicer unit 75, thereby generating a second synthesis signal sb.

Figure 4:
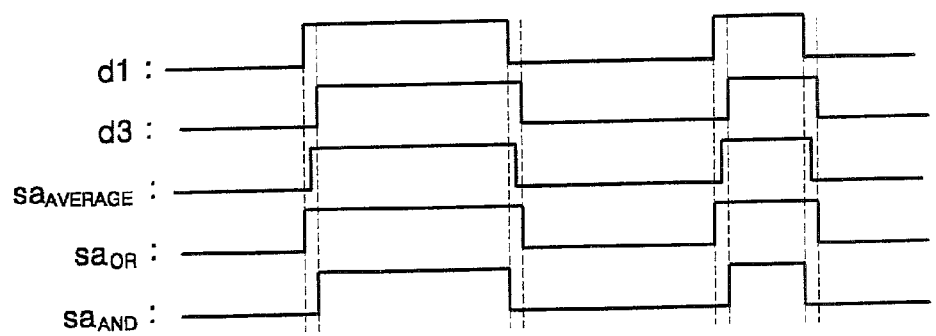
FIG. 4 is a graph illustrating a principle of synthesis of signals performed by time averaging, an AND operation, and an OR operation in each synthesizer of the differential phase detection device of FIG. 3.

As shown in FIG. 4, when the first synthesizer 77 performs time-averaging on the first and third digitized signals d1 and d3, a first synthesis signal $sa_{AVERAGE}$ is generated. When the first synthesizer 77 performs an AND operation on the first and third digitized signals d1 and d3, a first synthesis signal $sa_{AND}$ is generated. When the first synthesizer 77 performs an OR operation on the first and third digitized signals d1 and d3, a first synthesis signal $sa_{OR}$ is generated. The second synthesizer 79 also generates the second synthesis signal sb by synthesizing the second and fourth digitized signals d2 and d4 similarly to the first synthesizer 77. Because each of the first and second synthesis signals sa and sb generated by the first and second synthesizers 77 and 79, respectively, changes a little depending on a synthesizing method used, the first and second synthesizers 77 and 79 may be provided such that the first and second synthesizers 77 and 79 can generate the first and second synthesis signals sa and sb using the same synthesis method.

The phase difference detector 85 detects a phase difference between the first and second synthesis signals sa and sb output from the first and second synthesizers 77 and 79, thereby outputting first and second phase difference signals pa and pb. It is assumed that the first synthesis signal sa is input to a positive (+) input terminal of the phase difference detector 85, and the second synthesis signal sb is input to a negative (−) input terminal of the phase difference detector 85. The first phase difference signal pa corresponds to a phase difference between the first and second synthesis signals sa and sb when the phase of the first synthesis signal sa input to the (+) input terminal leads the phase of the second synthesis signal sb. The second phase difference signal pb corresponds to the phase difference between the first and second synthesis signals sa and sb when the phase of the second synthesis signal sb input to the (−) input terminal leads the phase of the first synthesis signal sa.

When the differential phase detection device 70 is used in the tracking error signal detection apparatus, the matrix circuit 87 performs a differential operation and integration on the first and second phase difference signals pa and pb output from the phase difference detector 85. A result signal from the matrix circuit 87 by performing the differential operation and integration on the first and second phase difference signals pa and pb is a tracking error signal TES. The matrix circuit 87 of the differential phase detection device 70 is appropriately modified depending on a system or apparatus employing the differential phase detection device 70. For example, when the differential phase detection device 70 is employed by a seek direction detection system; the matrix circuit 87 has a structure of summing and integrating the two input phase difference signals pa and pb.

Figure 5:
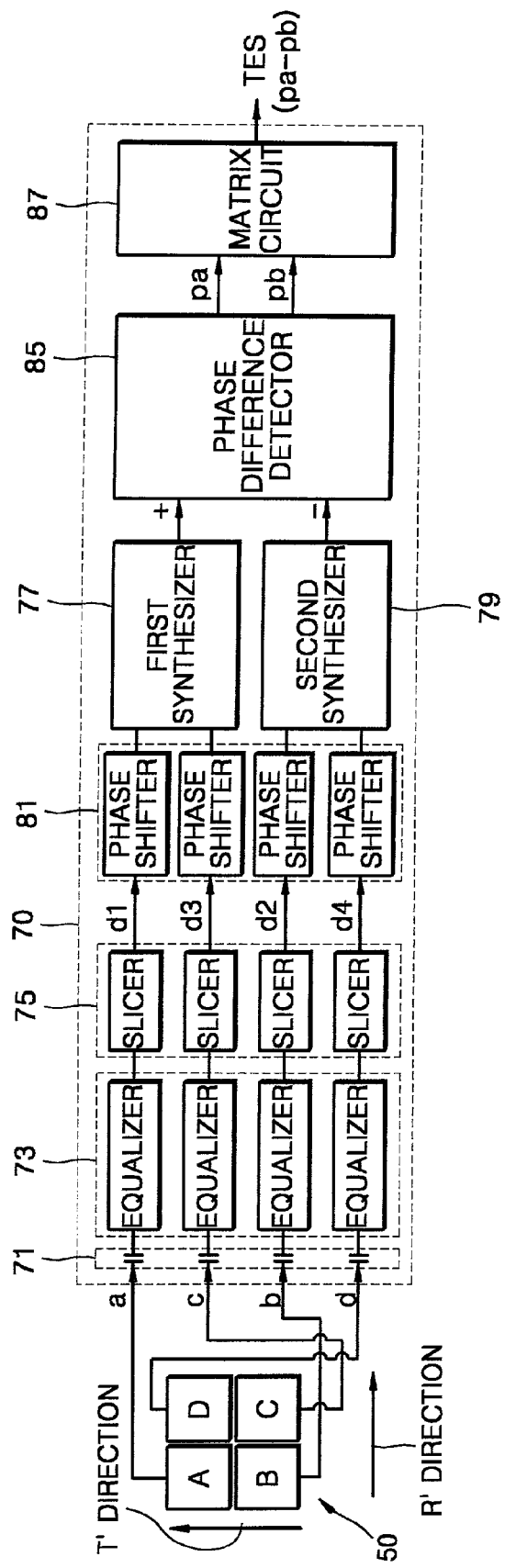
FIG. 5 is a schematic block diagram illustrating a tracking error signal detection apparatus using a differential phase detection device according to an alternative embodiment of the present invention.

The differential phase detection device 70 according to the present invention, for instance, may include a phase shifter 81 for shifting a phase of an input signal to control an offset or balance of a final output. In this instance, two phase shifters 81 may be installed such that one phase shifter is disposed between the first synthesizer 77 and one input terminal of the phase difference detector 85, and the other phase shifter is disposed between the second synthesizer 79 and the other input terminal of the phase difference detector 85. Alternatively, the phase shifter 81 may be disposed between the slicer unit 75 and the input terminals of the first and second synthesizers 77 and 79, as shown in FIG. 5. When the phase shifter 81 is disposed between the slicer unit 75 and the input terminals of the first and second synthesizers 77 and 79, as shown in FIG. 5, different time delays may be applied to each individual first through fourth digitized signals d1, d2, d3, and d4, so that an offset and balance of an output signal can be controlled more effectively.

Figure 1:
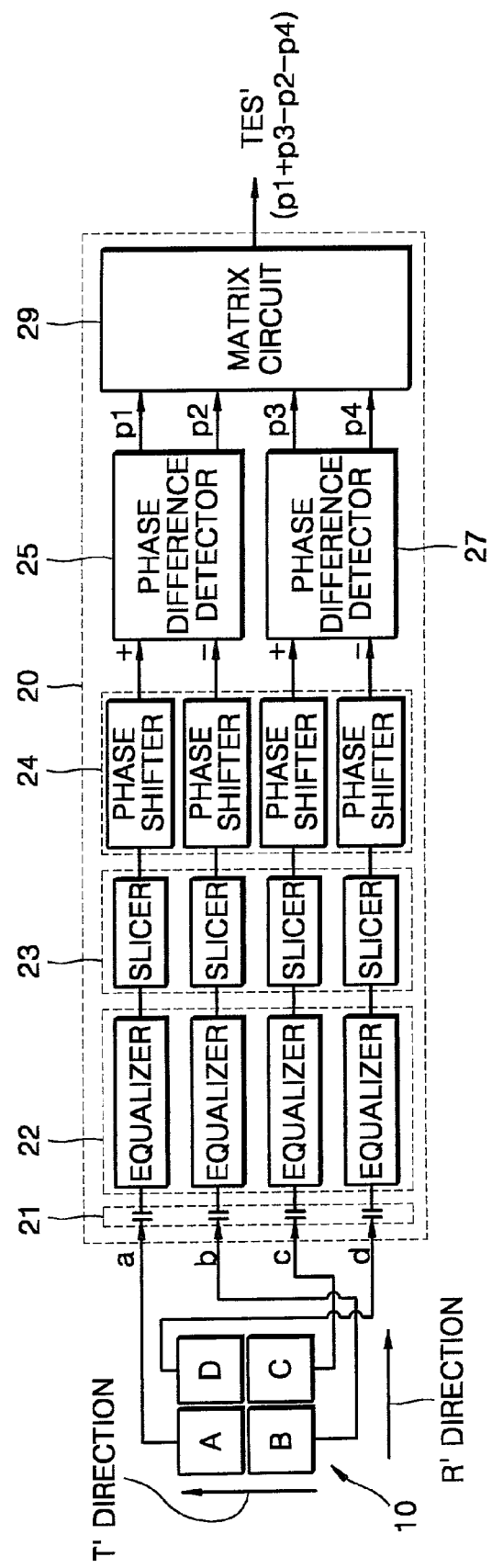
FIG. 1 is a schematic block diagram illustrating a tracking error signal detection apparatus using a conventional differential phase detection device.
Figure 2:
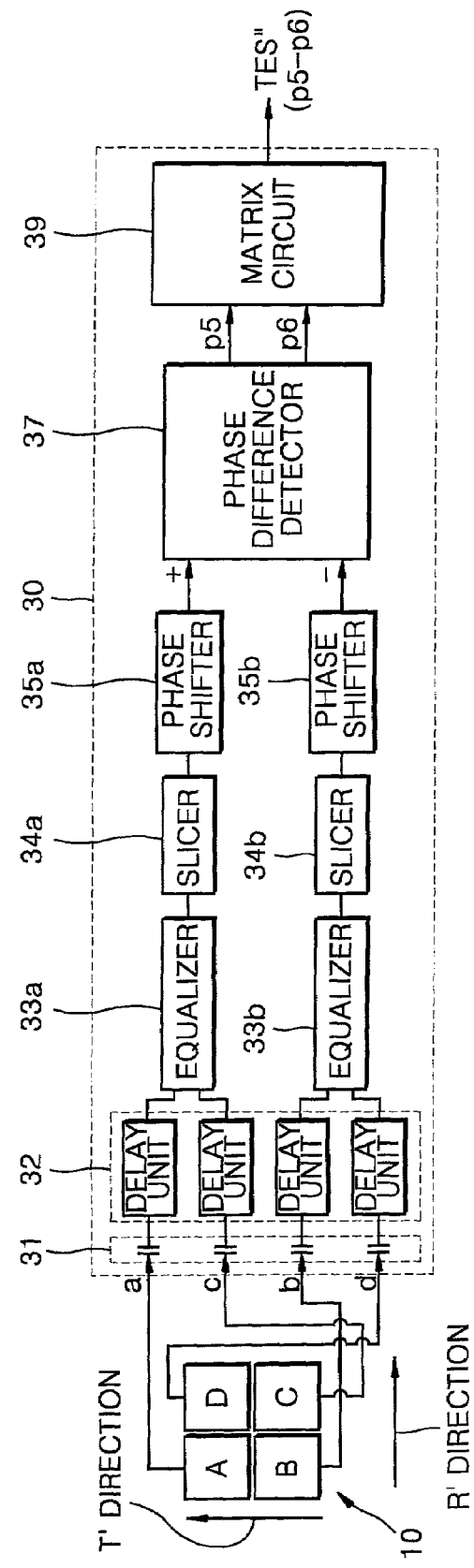
FIG. 2 is a schematic block diagram illustrating a tracking error signal detection apparatus using another conventional differential phase detection device.
Figure 6A:
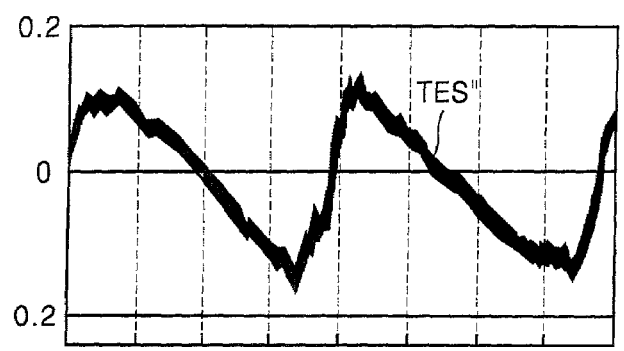
FIG. 6A is a graph illustrating a tracking error signal detected by the conventional differential phase detection device of FIG. 2 with respect to a DVD-ROM disc.
Figure 6B:
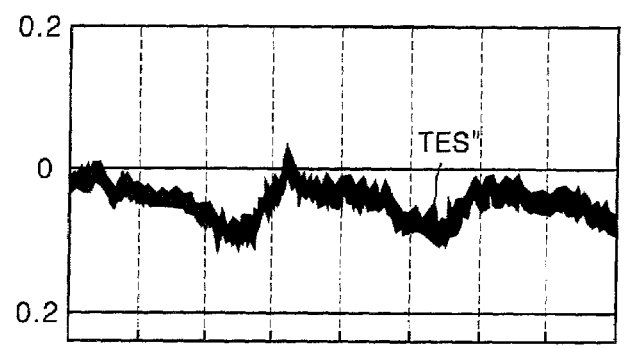
FIG. 6B is a graph illustrating a tracking error signal detected by the conventional differential phase detection device of FIG. 2 with respect to a DVD-RW disc.
Figure 7A:
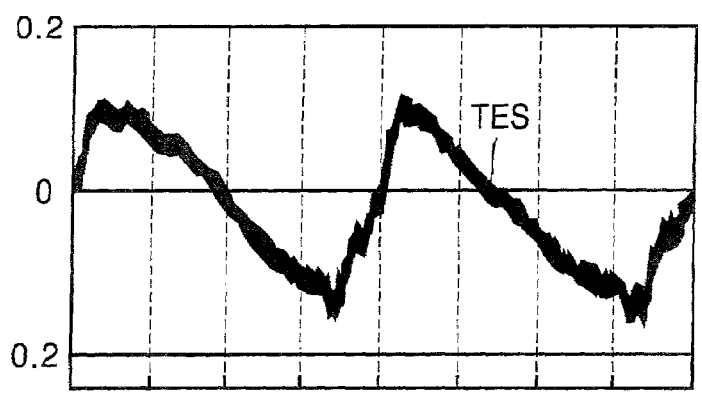
FIG. 7A is a graph illustrating a tracking error signal detected by the differential phase detection device according to the present invention with respect to a DVD-ROM disc, when each of the first and second synthesizers of the differential phase detection device is realized as an AND gate.
Figure 7B:
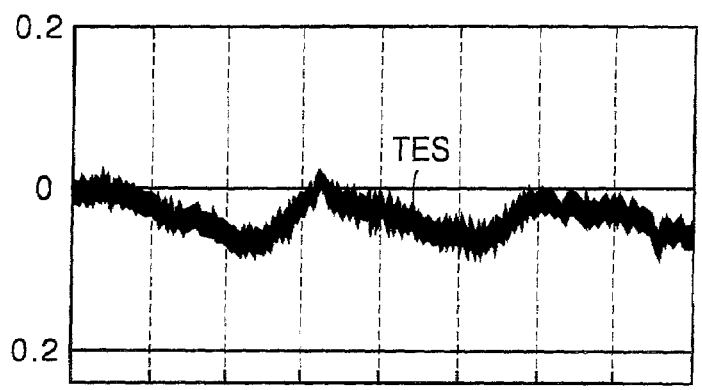
FIG. 7B is a graph illustrating a tracking error signal detected by the differential phase detection device according to the present invention with respect to a DVD-RW disc, when each of the first and second synthesizers of the differential phase detection device is realized as an AND gate.
Figure 8A:
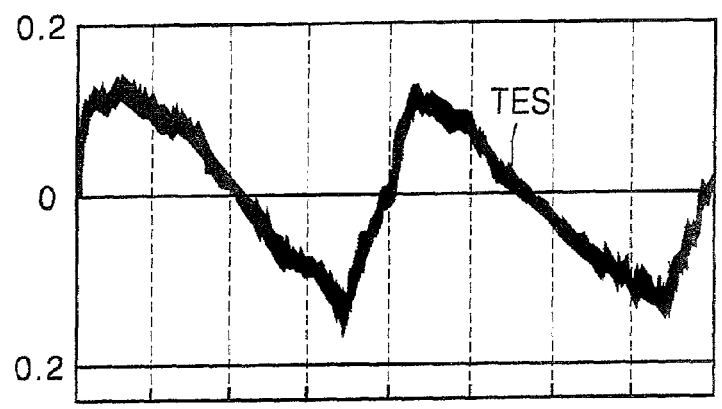
FIG. 8A is a graph illustrating the tracking error signals detected by the differential phase detection device according to the present invention with respect to a DVD-ROM disc, when each of the first and second synthesizers of the differential phase detection device is realized as an OR gate.
Figure 8B:
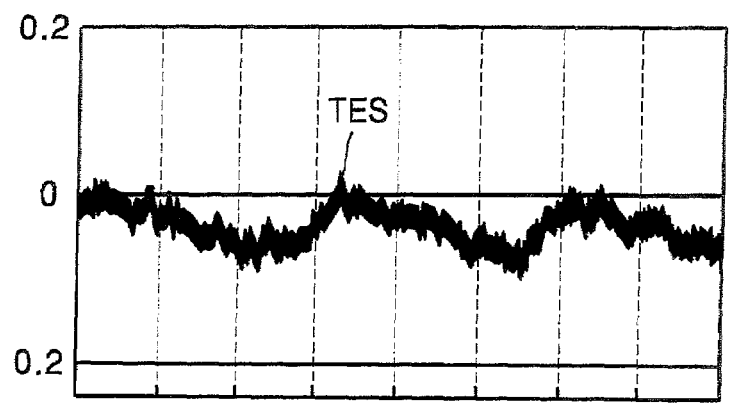
FIG. 8B is a graph illustrating the tracking error signal detected by the differential phase detection device according to the present invention with respect to a DVD-RW disc, when each of the first and second synthesizers of the differential phase detection device is realized as an OR gate.

The following description concerns characteristics of a signal detected by a tracking error signal detection apparatus employing the differential phase detection device 70 according to the present invention. FIGS. 6A and 6B are graphs illustrating tracking error signals TES" detected by the conventional differential phase detection device 30 of FIG. 2 with respect to a DVD-ROM disc and a DVD-RW disc, respectively. FIGS. 7A and 7B are graphs illustrating tracking error signals TES detected by the differential phase detection device 70 according to the present invention with respect to a DVD-ROM disc and a DVD-RW disc, respectively, when each of the first and second synthesizers 77 and 79 is realized as an AND gate. FIGS. 8A and 8B are graphs illustrating tracking error signals TES detected by the differential phase detection device 70 according to the present invention with respect to a DVD-ROM disc and a DVD-RW disc, respectively, when each of the first and second synthesizers 77 and 79 is realized as an OR gate.

As shown in FIGS. 6A, 7A, and 8A, for a DVD-ROM disc, the differential phase detection device 70 according to the present invention can detect a tracking error signal which is not inferior to that detected by the conventional differential phase detection device 70 employing the delay unit 32. As shown in FIGS. 6B, 7B, and 8B, for a DVD-RW disc, the differential phase detection device 70 according to the present invention can also detect a tracking error signal which is not inferior to that detected by the conventional differential phase detection device 70 employing the delay unit 32. In addition, it can be appreciated by comparing FIG. 7A and FIG. 8A and comparing FIG. 7B and FIG. 8B, tracking error signals including similar qualities are detected when each of the first and second synthesizers 77 and 79 is realized as an AND gate and when each of the first and second synthesizers 77 and 79 is realized as an OR gate.

FIGS. 9 through 15 are graphs illustrating offsets of the tracking error signal TES detected by the tracking error signal detection apparatus according to the present invention in an on-track state with respect to a radial tilt, a tangential tilt, a defocus, a detrack, a shift of an objective lens, a change in thickness of an optical disc, a change in depth of a pit recorded on the optical disc, respectively. Here, the optical disc is a DVD-ROM.

Figure 9:
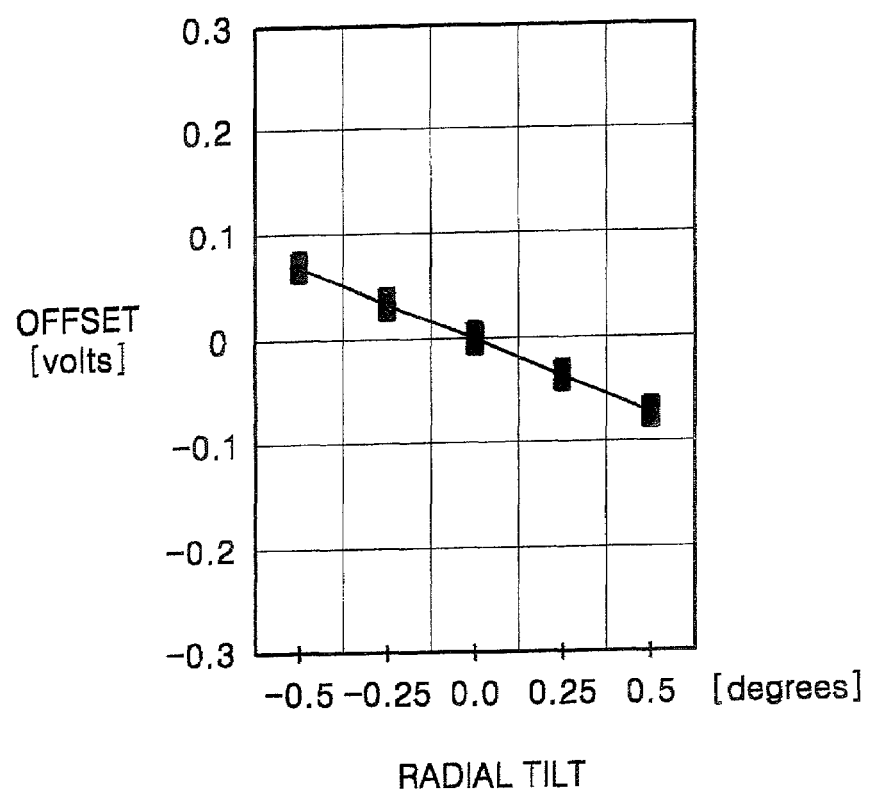
FIG. 9 is a graph illustrating an offset of the tracking error signal detected by the tracking error signal detection apparatus according to the present invention in an on-track state with respect to a radial tilt.
Figure 10:
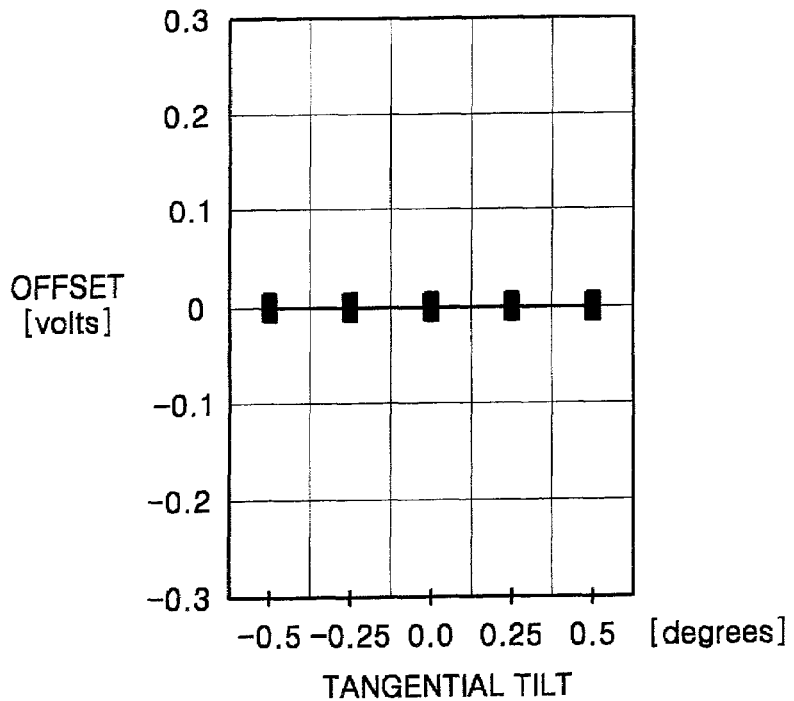
FIG. 10 is a graph illustrating an offset of the tracking error signal detected by the tracking error signal detection apparatus according to the present invention in the on-track state with respect to a tangential tilt.
Figure 11:
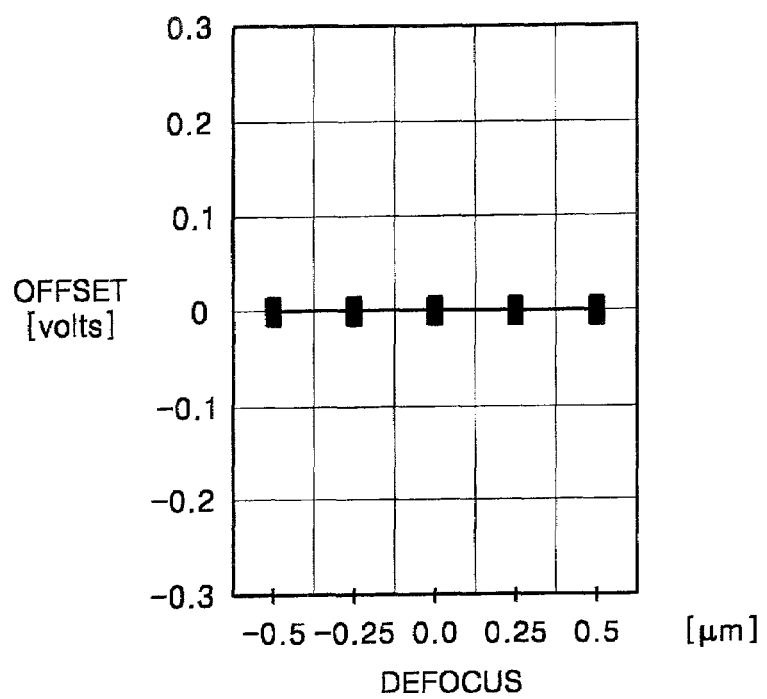
FIG. 11 is a graph illustrating an offset of the tracking error signal detected by the tracking error signal detection apparatus according to the present invention in the on-track state with respect to a defocus.
Figure 12:
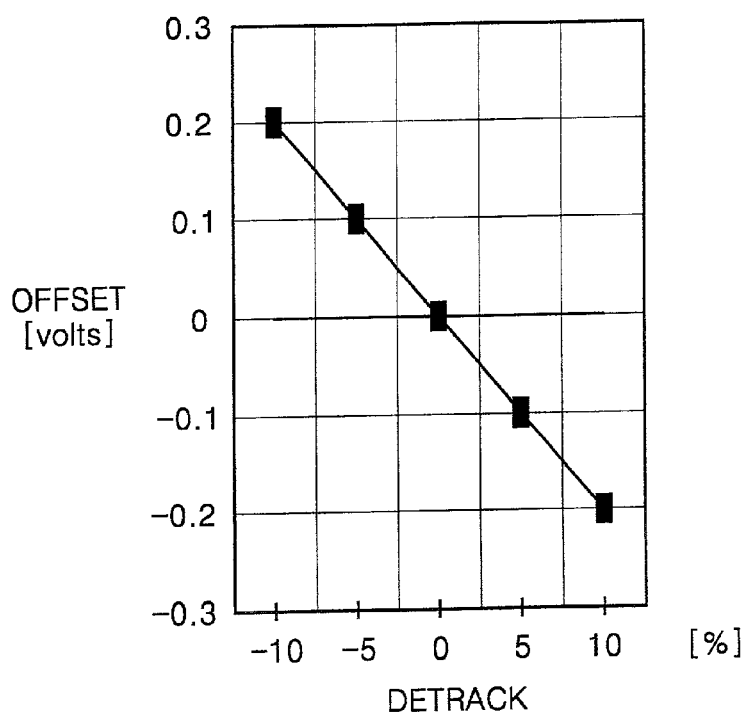
FIG. 12 is a graph illustrating an offset of the tracking error signal detected by the tracking error signal detection apparatus according to the present invention in the on-track state with respect to a detrack.
Figure 13:
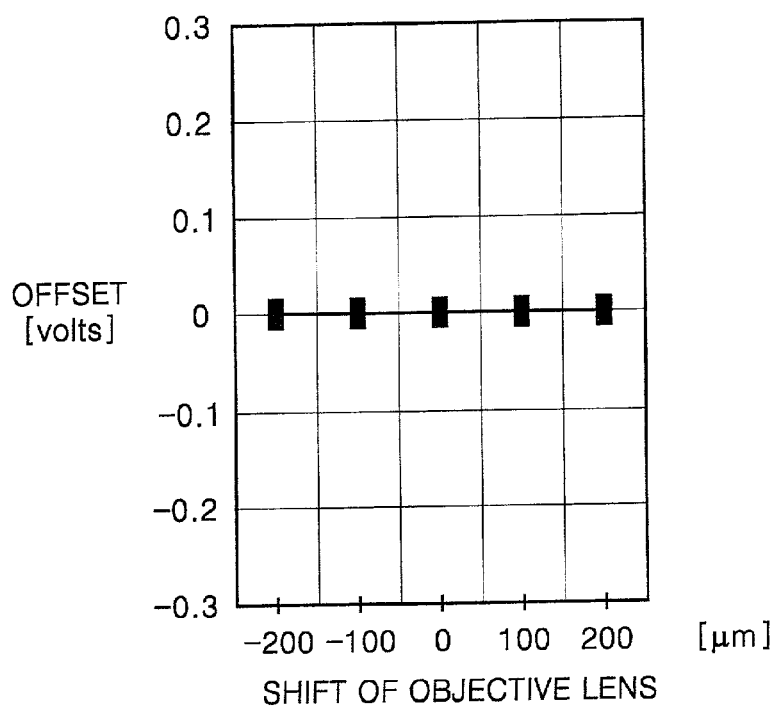
FIG. 13 is a graph illustrating an offset of the tracking error signal detected by the tracking error signal detection apparatus according to the present invention in the on-track state with respect to a shift of an objective lens.
Figure 14:
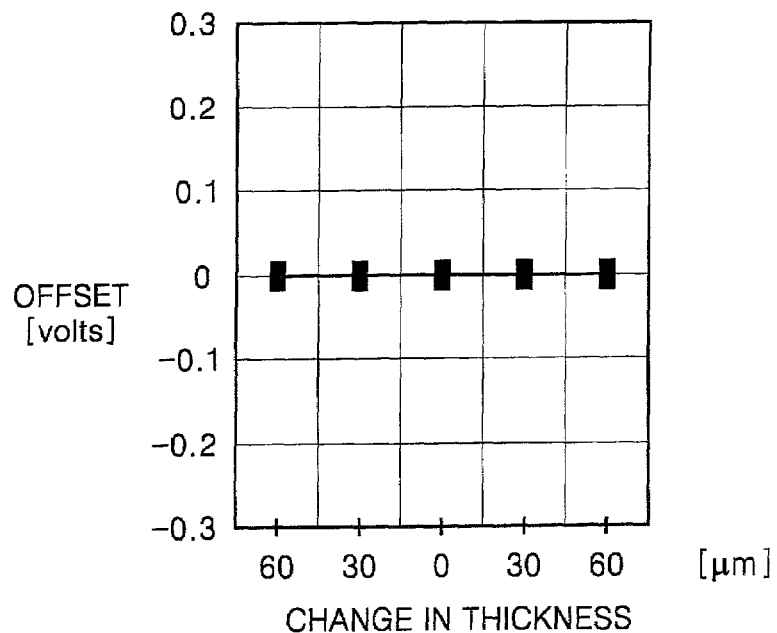
FIG. 14 is a graph illustrating an offset of the tracking error signal detected by the tracking error signal detection apparatus according to the present invention in the on-track state with respect to a change in the thickness of an optical disc.
Figure 15:
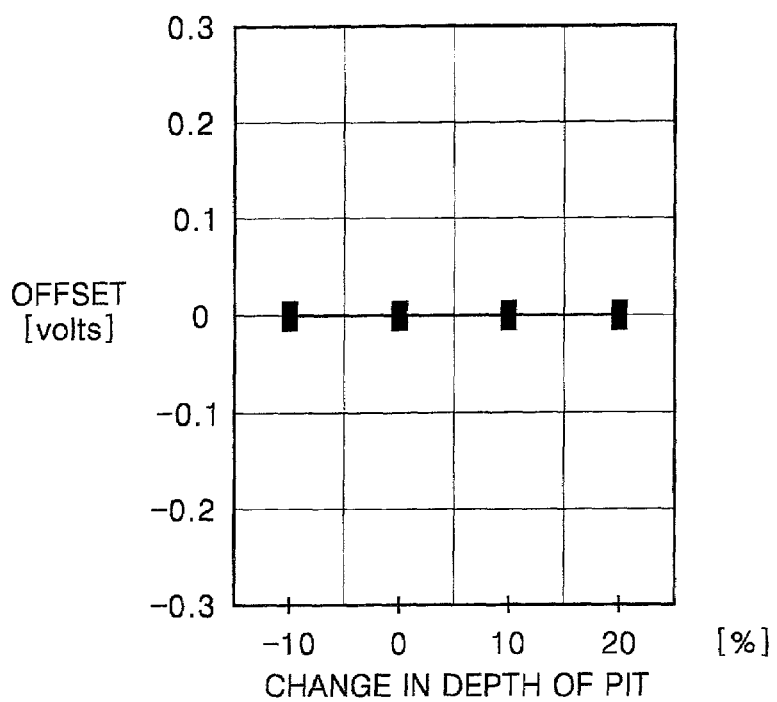
FIG. 15 is a graph illustrating an offset of the tracking error signal detected by the tracking error signal detection apparatus according to the present invention in the on-track state with respect to a change in a depth of a pit recorded on the optical disc.

As shown in FIGS. 9 through 15, a tracking error signal detection apparatus, according to the present invention, can detect a tracking error signal TES which is rarely affected by the radial tilt, the tangential tilt, the defocus, the shift of the objective lens, the change in the thickness of the optical disc, and the change in the depth of the pit, but reacts greatly to the detrack. Referring to FIG. 9, a tracking error signal TES detected by the tracking error signal detection apparatus, according to the present invention, is slightly influenced by the radial tilt, but this influence can be ignored because an offset value with respect to the radial tilt is within a tilt margin of the system.

Figure 16:
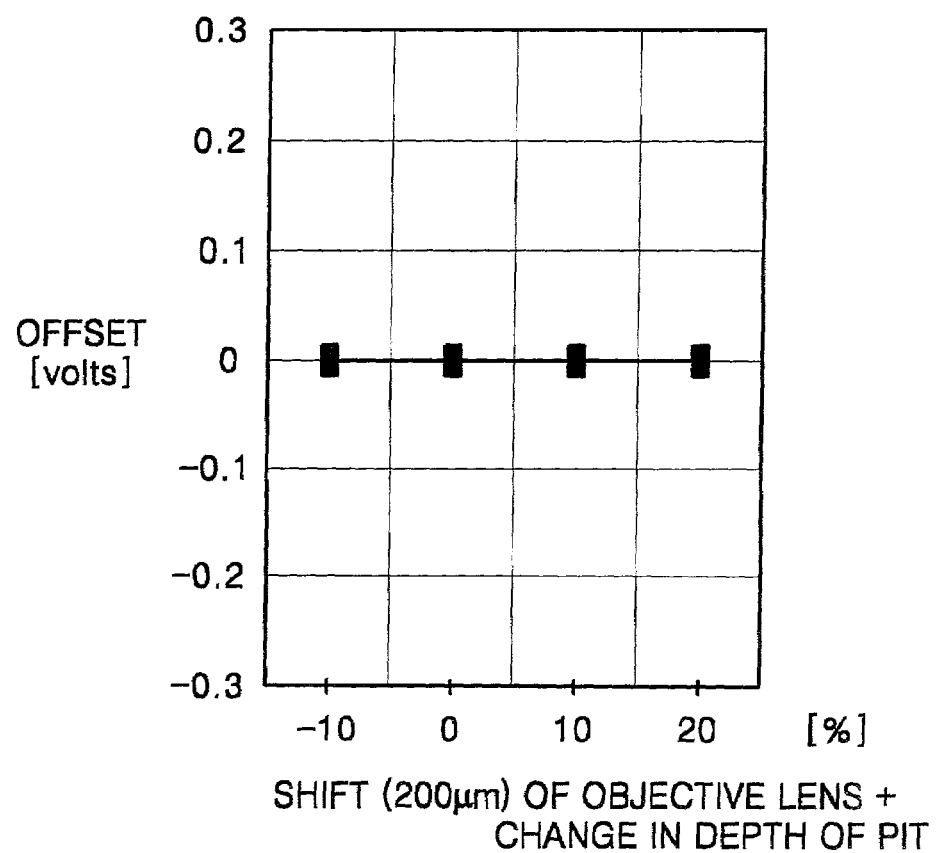
FIG. 16 is a graph illustrating an offset of the tracking error signal detected by the tracking error signal detection apparatus according to the present invention in the on-track state with respect to a shift of the objective lens plus a change in a depth of a pit recorded on the optical disc.

Even when a change in the depth of the pit recorded on an optical disc and the shift of an objective lens occur simultaneously, as shown in FIG. 16, the tracking error signal detected by the tracking error signal detection apparatus, according to the present invention, does not have an offset. FIG. 16 is a graph illustrating an offset depending on a change in the depth of the pit in a state in which the objective lens is shifted by 200 µm. As seen from the above description, the differential phase detection device 70 according to the present invention includes fewer components than the conventional differential phase detection device 70 and responds to and compensates for offsets similarly to the conventional differential phase detection device 70.

It has been described that the differential phase detection device 70 according to the present invention receives and performs an operation on the four detection signals a, b, c and d output from the four-division photodetector 50 and outputs the tracking error signal TES according to a differential phase detection method. Specifically, the differential phase detection device 70, according to the present invention, may be modified and thereby applied to a variety of systems for detecting a differential phase. Here, a divided structure of the photodetector 50 varies with a type (e.g., radial tilt, tangential tilt or defocus) of differential phase signal to be detected.

As described above, the differential phase detection device, according to the present invention, includes a pair of synthesizers for synthesizing two digitized signals so that a delay unit conventionally used may be omitted while only a single phase difference detector is used. Consequently, the number of components is less than the number of components used by conventional tracking error signal detection apparatuses thereby reducing the size of the differential phase detection device, according to the present invention. In addition, a tracking error signal detection apparatus employing a differential phase detection device, according to the present invention, can detect a tracking error signal that is relatively less influenced by a radial tilt, a tangential tilt, a defocus, a change in thickness of an optical disc, a change in depth of a pit recorded on an optical disc and/or a shift of an objective lens, compared to the conventional differential phase detection device.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A differential phase detection device detecting a differential phase signal from first through fourth signals, the differential phase detection device comprising:
   a slicer slicing and digitizing each of the first through fourth signals with respect to a reference level;
   a first synthesizer synthesizing the first digitized signal and the third digitized signal to generate a first synthesis signal;
   a second synthesizer synthesizing the second digitized signal and the fourth digitized signal to generate a second synthesis signal;
   a phase difference detector comparing a phase of the first synthesis signal with a phase of the second synthesis signal to generate a first phase difference signal and a second phase difference signal; and
   a matrix circuit determining a difference between the first and second phase difference signals received from the phase difference detector to output the differential phase signal.

2. The differential phase detection device as recited in claim 1, wherein the first and second synthesizers perform a synthesis method comprising one of time averaging, an AND operation, or an OR operation on the first and third digitized signals and the second and fourth digitized signals to generate the first and second synthesis signals, respectively.

3. The differential phase detection device as recited in claim 2, wherein the first and second synthesizers generate the first and second synthesis signals using the same synthesis method.

4. The differential phase detection device as recited in claim 2, further comprising:
   an alternating current (AC) coupler removing direct current (DC) components from the first through fourth signals.

5. The differential phase detection device as recited in claim 4, further comprising:
   an equalizer amplifying the first through fourth signals or the first through fourth signals from the AC coupler, wherein the equalizer is provided between the AC coupler and the slicer.

6. The differential phase detection device as recited in claim 4, further comprising a phase shifter shifting a phase of an input signal between the slicer and the first and second synthesizers or between the first and second synthesizers and the phase difference detector.

7. The differential phase detection device as recited in claim 1, further comprising:
   an alternating current (AC) coupler removing direct current (DC) components from the first through fourth signals.

8. The differential phase detection device as recited in claim 7, further comprising:
   an equalizer amplifying the first through fourth signals or the first through fourth signals from the AC coupler, wherein the equalizer is provided between the AC coupler and the slicer.

9. The differential phase detection device as recited in claim 7, further comprising a phase shifter shifting a phase of an input signal between the slicer and the first and second synthesizers or between the first and second synthesizers and the phase difference detector.

10. The differential phase detection device as recited in claim 9, wherein when the phase shifter shifts the phase of the input signal between the slicer and the first and second synthesizers, different time delays are applied to each of the first through fourth digitized signals controlling an offset and balance of the shifted phase of the input signal.

11. The differential phase detection device as recited in claim 1, further comprising a phase shifter shifting a phase of an input signal between the slicer and the first and second synthesizers or between the first and second synthesizers and the phase difference detector.

12. The differential phase detection device as recited in claim 2, further comprising a phase shifter shifting a phase of an input signal between the slicer and the first and second synthesizers or between the first and second synthesizers and the phase difference detector.

13. The differential phase detection device as recited in claim 1, wherein the first phase difference signal corresponds to a phase difference between the first and second synthesis signals when the phase of the first synthesis signal input to a (+) input terminal of the phase difference detector leads the phase of the second synthesis signal.

14. The differential phase detection device as recited in claim 1, wherein the second phase difference signal corresponds to a phase difference between the first and second synthesis signals when the phase of the second synthesis signal input to a (−) input terminal of the phase difference detector leads the phase of the first synthesis signal.

15. The differential phase detection device as recited in claim 1, wherein the matrix circuit performs differential and integration operations on the first and second phase difference signals to output the differential phase signal indicative of a tracking error signal.

16. The differential phase detection device as recited in claim 1, wherein the matrix circuit performs summation and integration operations on the first and second phase difference signals to output the differential phase signal indicative of a tracking error signal.

17. The differential phase detection device as recited in claim 1, further comprising:
   a first phase shifter shifting the phase of the first synthesis signal and disposed between the first synthesizer and one input terminal of the phase difference detector; and
   a second phase shifter shifting the phase of the second synthesis signal and disposed between the second synthesizer and another input terminal of the phase difference detector.

18. The differential phase detection device as recited in claim 1, further comprising:
   a first phase shifter shifting a phase of the first and third digitized signals and disposed between the slicer and an input terminal of the first synthesizer; and
   a second phase shifter shifting a phase of the second and fourth digitized signals and disposed between the slicer and an input terminal of the second synthesizer.

19. The differential phase detection device as recited in claim 18, wherein when the first and second phase shifters shift the phase of the first and third digitized signals and the second and fourth digitized signals, respectively, and is disposed between the slicer and the first and second synthesizers, different time delays are applied to each of the first through fourth digitized signals controlling an offset and balance of the shifted phase of the input signal.

20. The differential phase detection device as recited in claim 1, wherein a delay unit is omitted.

21. A differential phase detection device receiving first through fourth detection signals from a photodetector to detect therefrom a differential phase signal, the differential phase detection device comprising:
   a slicer slicing and digitizing each of the detection signals with respect to a reference level;

a synthesizer synthesizing the digitized detection signals and generating therefrom synthesis signals;

a phase difference detector comparing phases of the synthesis signals and outputting a first phase difference signal and a second phase difference signal; and a matrix circuit processing the first and second phase difference signals to output the differential phase signal.

22. The differential phase detection device as recited in claim 21, wherein the synthesizer comprises:

a first synthesizer generating a first one of the synthesis signals; and a second synthesizer generating a second one of the synthesis signal.

23. The differential phase detection device as recited in claim 22, wherein the first phase difference signal corresponds to a phase difference between the first and second synthesis signals when the phase of the first synthesis signal input to a (+) input terminal of the phase difference detector leads the phase of the second synthesis signal.

24. The differential phase detection device as recited in claim 22, wherein the second phase difference signal corresponds to a phase difference between the first and second synthesis signals when the phase of the second synthesis signal input to a (−) input terminal of the phase difference detector leads the phase of the first synthesis signal.

25. The differential phase detection device as recited in claim 22, wherein the first and second synthesizers perform a synthesis method comprising one of time averaging, an AND operation, or an OR operation on the first and third detection signals and the second and fourth detection signals, respectively, to generate the first and second synthesis signals.

26. The differential phase detection device as recited in claim 21, further comprising a phase shifter shifting a phase of an input signal between the slicer and the first and second synthesizers or between the first and second synthesizers and the phase difference detector.

27. The differential phase detection device as recited in claim 21, wherein a delay unit is omitted.

28. A tracking error signal detection apparatus, comprising:

a photodetector comprising first through fourth division plates which are disposed counterclockwise or clockwise along directions corresponding to radial and tangential directions of the recording medium, wherein the first and third division plates are positioned in one diagonal direction and the second and fourth division plates are position in another diagonal direction and the first through fourth division plates receive light reflected from a recording medium to generate first through fourth detection signals, respectively; and a differential phase detection device detecting a tracking error signal from the first through fourth detection signals output from the photodetector, the differential phase detection device comprising:

a slicer slicing and digitizing each of the first through fourth detection signals with respect to a reference level, a first synthesizer synthesizing the first digitized signal and the third digitized signal to generate a first synthesis signal, a second synthesizer synthesizing the second signal and the fourth signal to generate a second synthesis signal, a phase difference detector comparing a phase of the first synthesis signal with a phase of the second synthesis signal to generate a first phase difference signal and a second phase difference signal, respectively, and a matrix circuit processing the first and second phase difference signals received from the phase difference detector to output a tracking error signal.

29. The tracking error signal detection apparatus as recited in claim 28, wherein the matrix circuit performs differential and integration operations on the first and second phase difference signals to output the differential phase signal indicative of the tracking error signal.

30. The tracking error signal detection apparatus as recited in claim 28, wherein the matrix circuit performs summation and integration operations on the first and second phase difference signals to output the differential phase signal indicative of the tracking error signal.

31. The tracking error signal detection apparatus as recited in claim 28, wherein the first and second synthesizers perform a synthesis method comprising time averaging, an AND operation, or an OR operation on the first and third signals and the second and fourth signals, respectively, to generate the first and second synthesis signals, respectively.

32. The tracking error signal detection apparatus as recited in claim 28, further comprising:

an alternating current (AC) coupler removing direct current (DC) components from the first through fourth signals.

33. The tracking error signal detection apparatus as recited in claim 32, further comprising:

an equalizer amplifying the first through fourth signals or the first through fourth signals from the AC coupler, wherein the equalizer is provided between the AC coupler and the slicer.

34. The tracking error signal detection apparatus as recited in claim 31, further comprising:

an alternating current (AC) coupler removing direct current (DC) components from the first through fourth signals.

35. The tracking error signal detection apparatus as recited in claim 34, further comprising:

an equalizer amplifying the first through fourth signals or the first through fourth signals from the AC coupler, wherein the equalizer is provided between the AC coupler and the slicer.

36. The tracking error signal detection apparatus as recited in claim 32, further comprising a phase shifter shifting a phase of an input signal between the slicer and the first and second synthesizers or between the first and second synthesizers and the phase difference detector.

37. The tracking error signal detection apparatus as recited in claim 34, further comprising a phase shifter shifting a phase of an input signal between the slicer and the first and second synthesizers or between the first and second synthesizers and the phase difference detector.

38. The tracking error signal detection apparatus as recited in claim 28, further comprising a phase shifter shifting a phase of an input signal between the slicer and the first and second synthesizers or between the first and second synthesizers and the phase difference detector.

39. The tracking error signal detection apparatus as recited in claim 31, further comprising a phase shifter shifting a phase of an input signal between the slicer and the first and second synthesizers or between the first and second synthesizers and the phase difference detector.

40. The tracking error signal detection apparatus as recited in claim 28, wherein the differential phase detection device lacks a delay unit.

* * * * *